Figure 1:
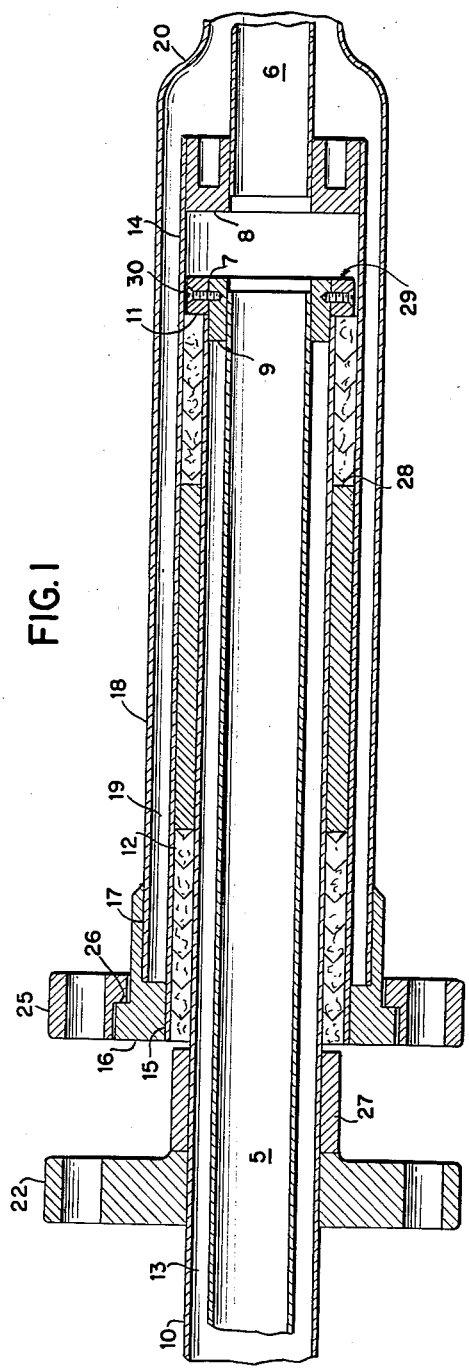

April 18, 1961

C. D. HOLBEN 2,980,448

CONNECTOR FOR JOINING PIPELINES HAVING OUTER JACKET
INSULATION IN CONTINUOUSLY INSULATED RELATION

Filed March 24, 1958

INVENTOR.
Clair D. Holben

BY

*Philip S. McBean*

ATTORNEY

United States Patent Office 2,980,448
Patented Apr. 18, 1961

2,980,448

CONNECTOR FOR JOINING PIPELINES HAVING OUTER JACKET INSULATION IN CONTINUOUSLY INSULATED RELATION

Clair D. Holben, Denver, Colo., assignor to Beech Aircraft Corporation, Wichita, Kans., a corporation of Delaware Filed Mar. 24, 1958, Ser. No. 723,185

1 Claim. (Cl. 285—47)

The invention herein disclosed relates to conduits having outer jacket insulation, such as used for carrying liquefied gases at low temperatures.

Objects of the invention are to provide a pressure tight connector for such pipelines, which can be readily connected and disconnected and which will be insulated across the joint by double wall jacket construction of the same effective character as the rest of the pipeline.

Further special objects of the invention are to provide a connector for jacketed conduits, in which the flow area of the conduit will be maintained uniform and continuous to avoid turbulence and impedance of flow and in which the overall jacket size of the joint will be kept at a minimum.

Other special objects of the invention are to effect continuous engagement of the inner conduit sections and to provide means for maintaining this continuity, thus to compensate for possible wear, shrinkage or improper length of parts.

Other important objects of the invention are to provide a connector of the type indicated, which while not requiring rotary relation of connected parts, may permit such rotation if required, to bring parts into alignment and in which sealing of the connected parts together will be effective and can be maintained effective under all conditions.

Further objects of the invention are to provide a connector or coupling of the character indicated, which will be of simple construction, reasonable in cost and which will not require special tools, but may be connected and disconnected by usually available tools, such as an ordinary wrench.

Other desirable objects attained by the invention and the novel features through which the purposes of the invention are accomplished, are set forth and will appear in the course of the following specification.

The drawing accompanying and forming part of the specification is illustrative of a present practical embodiment of the invention, but structure may be modified and changed as regards such illustration, all within the true intent and scope of the invention, as hereinafter defined and claimed.

Fig. 1 in the drawing is a broken longitudinal sectional view of one of the conductors showing two sections of conduit engaged, ready to be connected.

Figure 2:
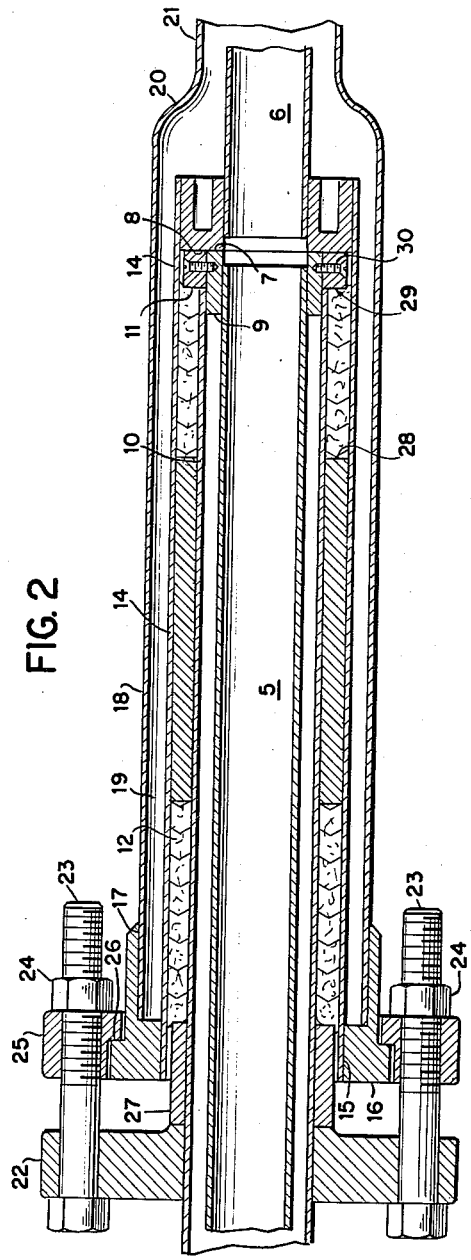

Fig. 2 is a similar view showing the two sections of pipeline fully connected.

In the drawing, the inner conduit of one pipeline section is designated 5, and the corresponding inner condiut of a companion pipeline section is designated 6. These meet in aligned end-to-end engagement through the medium of abutting end collars 7, 8, welded or otherwise affixed to them. The end ring or collar 7, is shown as shouldered at the inner side at 9, providing an annular seat for the outer jacket 10, of conduit 5, and an abrupt abutment shoulder 11, for packing 12, which is interposed between the two pipeline sections.

The jacket pipe 10, is welded or otherwise permanently secured to end ring 7, so as to provide a permanently sealed annular insulating space 13, clear to the end of the pipeline section 5.

In similar fashion, a permanently sealed insulating jacket is provided about the mating pipe section 6, and extended to receive an elongated portion of the first insulated section by tubing 14, welded or otherwise attached to end ring 8, and extended to encompass packing 12 and the permanently sealed end portion of the other pipe section, with this extended tubing welded or otherwise secured at 15, inside a coupling ring 16, and to which coupling ring, there is welded or otherwise secured at 17, the outer jacket tubing 18, of the second pipe section.

Jacket 18 is enlarged where it extends over the inner extension wall 14 of the second pipe section, providing an annular permanently sealed insulating chamber 19, extending all the way to the end of the second pipe section and it is shown as reduced at 20, behind the end collar 8, down to a size at 21, suitable for an insulating cover over the inner conduit section 6.

The companion piece to the coupling ring 16, is shown as a flange 22, rotatably centered over the jacket 10, of the first pipe section and connected with the ring 16, fixed on the jacketed end of the second pipe section by bolts and nuts 23, 24.

Further possibilities of relatively rotative adjustment are provided for by having these bolts extend through an anchor ring 25, rotatably shouldered on the end ring 16 at 26.

The packing 12, is shown as V-ring or chevron packing, which under longitudinal compression will expand radially to completely fill and seal the annular space between the jacket wall 10 of the first pipeline section and the extension wall 14, of the second section.

To allow a degree of self-adjustment in taking up on the packing, a loose thrust sleeve or bushing 27, is interposed between takeup flange 22, and the outer end of the packing.

Fig. 1 shows how the parts are assembled. The extension 14, end ring 16, and surrounding jacket 18, constitute a permanently sealed insulated socket or chamber extension of the pipeline 6, of a size to receive the end ring 7 and permanently sealed insulated jacket on the end of pipeline section 5, with end ring 7, in face-to-face relation with end ring 8, and with the elongated annular space between jacket wall 10 of the first section and extension wall 14, of the second section providing an elongated compression chamber for the packing.

For connecting the pipeline sections therefore, it is only necessary to introduce the permanently sealed end portion of the first section into the permanently sealed extended insulated portion of the second section and to then connect the coupling flanges or rings 16 and 22, to apply end pressure through bushing 27, on packing 12, which at its inner end abuts shoulder 11, on the end ring 7 of the first pipe section.

The pressure in packing 12 from tightening nuts 24 on bolts 23 is thus made effective to metal seal the end ring 7 of the first pipe section to the end ring 8 of the second pipe section with conduit sections 5 and 6 in alignment and full cross section to freely pass the liquefied gas or other fluid.

The permanently sealed insulating jacket spaces 13 and 19 on the ends of the mating pipe sections overlap a considerable length, effectively insulating the joint and providing a long heat path preventing thermal losses.

The packing 12 may have a spacer 28 interposed intermediate the ends of the same and the length of the spacer may be determined at the point of application.

This packing, with optional spacer 28, when used, effectively seals the space between the overlapping parts against escape of liquid or gas and prevents thermal losses to or from the atmosphere through contained fluids.

The abrupt abutment shoulder 11 for the end ring 7 may be provided, as shown, by a separate surrounding ring 29, secured by counter-sunk screws 30, snap ring or other fastening on the fixed end ring 7.

The structure is relatively simple and of sturdy design and does not add objectionable weight, bulk or complication to the connected pipe lines.

While for simplicity, bolt connections may be preferred, it is contemplated that the coupling elements may be connected by other such means.

The requisite parts are relatively few in number, these are readily assembled and at reasonable cost.

The permanently sealed jacketed end of the first pipeline section is accurately centered at the inner end in the elongated permanently sealed jacketed end of the second pipeline section by the compressed packing between the two and by engagement of the jacket spacing rings at the meeting ends of these sections and at the outer end by the packing and by the packing compressing bushing. The packing thus serves a multiple purpose of sealing the jacketed conductors in the overlapping insulated relation, excluding fluid between these parts and mechanically supporting and reinforcing the same and while shown as all of the same V-ring structure may be of varying structure or material to meet specified requirements.

What is claimed is:

Connector for pipelines having outer jacket insulation comprising first and second inner pipe sections of substantially equal diameter in end to end relation and having end rings fixed thereon in abutting face to face relation, the end ring on the first pipe section being of less outer diameter than the outer diameter of the end ring on the second pipe section, an outer jacket wall on said first pipe section permanently sealed to the smaller end ring on that section in spaced relation to said first pipe section, an extension wall of larger diameter than the outer jacket wall of said first section permanently sealed to said larger end ring on said second section and extending over said smaller end ring and in spaced relation over the jacket wall of said first section, a jacket wall over said second pipe line section and extending in spaced relation over said extension wall, a coupling ring permanently sealed to the ends of said extension wall and jacket wall extending thereover, packing interposed in the space between the jacket wall of said first pipe section and said extension wall of the second pipe section, an annular abutment shoulder on said smaller end ring extending across said space between said jacket wall of the first pipe section and said extension wall of the second pipe section and slidably received within said extension wall, said abutment shoulder being engaged by the inner end of said packing, a bushing surrounding the jacket wall of the first pipe section in thrust applying engagement with the outer end of said packing, a coupling flange surrounding the jacket wall of said first pipe section in thrust engagement with said bushing and screw means for adjustably connecting said coupling flange with said coupling ring and for applying thrust through said packing to force and secure the conduit sections together with the end rings in abutting metal seal engagement.

References Cited in the file of this patent

UNITED STATES PATENTS

| 880,812 | McArthur | Mar. 3, 1908 |
| 1,288,631 | McFarland | Dec. 24, 1918 |
| 2,785,536 | Hinckley | Mar. 19, 1957 |
| 2,880,020 | Audette | Mar. 31, 1959 |

FOREIGN PATENTS

| 675,935 | Great Britain | July 16, 1952 |